United States Patent [19]
Vishey et al.

[11] Patent Number: 5,988,757
[45] Date of Patent: Nov. 23, 1999

[54] VEHICLE SEAT ASSEMBLY

[75] Inventors: Gregory J. Vishey, Grosse Pointe Woods; Michael Walkowski, Lenox; Ashley L. Baisch, Clinton Township, all of Mich.

[73] Assignee: Lear Corporation, Southfield, Mich.

[21] Appl. No.: 09/164,917

[22] Filed: Oct. 1, 1998

Related U.S. Application Data

[63] Continuation-in-part of application No. 08/840,412, Apr. 29, 1997, abandoned, which is a continuation-in-part of application No. 08/705,198, Aug. 29, 1996, abandoned.

[51] Int. Cl.$^6$ ........................................... A47C 7/40
[52] U.S. Cl. ........................... 297/452.31; 297/452.36; 297/DIG. 2; 297/452.18
[58] Field of Search ........................ 297/DIG. 2, 452.31, 297/452.36, 452.29, 452.65, 452.14

[56] References Cited

U.S. PATENT DOCUMENTS

| | | |
|---|---|---|
| 3,837,392 | 9/1974 | Marzocchi . |
| 3,841,704 | 10/1974 | Platner et al. . |
| 4,287,143 | 9/1981 | Sears, Jr. et al. . |
| 4,299,924 | 11/1981 | Nomura et al. . |
| 4,492,408 | 1/1985 | Lohr . |
| 4,585,273 | 4/1986 | Higgs et al. . |
| 4,832,408 | 5/1989 | Bertsch et al. . |
| 4,858,291 | 8/1989 | Preti . |
| 5,029,942 | 7/1991 | Rink . |
| 5,088,793 | 2/1992 | Mithuhiro . |
| 5,236,247 | 8/1993 | Hewko . |
| 5,294,394 | 3/1994 | Sakai et al. . |
| 5,320,373 | 6/1994 | Robertson et al. . |
| 5,547,608 | 8/1996 | Harrison et al. . |

FOREIGN PATENT DOCUMENTS

| | | |
|---|---|---|
| 0294768 | 6/1988 | European Pat. Off. . |
| 2943940 U | 5/1981 | Germany . |
| 3236651 A1 | 3/1983 | Germany . |
| 4033270 A1 | 4/1992 | Germany . |
| 4233944 A1 | 4/1994 | Germany . |
| 4419139 A1 | 12/1995 | Germany . |
| 6-237833 | 8/1994 | Japan . |
| 1438905 | 6/1976 | United Kingdom . |

OTHER PUBLICATIONS

Christian Hauck et al, "Entwicklung einer Fahrersitzruckenlehne aus Ultramid fur Nutzfahrzeuge" Automobiltechnische Zeitschrift, No. 12, Dec. 1988, Stuttgart, pp. 689–695, XP 000082899.

SAE Technical Paper No. 900074, "A New Automated Performing Process For RTM & SRIM", by S.W. Horn et al, Feb. 26–Mar. 2, 1990,pp.41–48.

SAE Technical Paper No. 900305, "Structural RIM IMR", by M.F. Hurley, Feb. 26–Mar. 2, 1990, pp. 79–84.

SAE Technical Paper No.920497, "Low Density Structural RIM: Glass Mat Reinforced Structural Faom for Interior Trim Applications", by Paul W. Makey et al, Feb.24–28, 1992, pp. 59–64.

SAE Technical Paper No. 930174, "Transverse Permeability Measurements Through Stacked Glass Fiber Mats", by Sanjay Mishsra et al, Mar. 1–5, 1993, pp. 1–9.

(List continued on next page.)

*Primary Examiner*—Anthony D. Barfield
*Attorney, Agent, or Firm*—Brooks & Kushman P.C.

[57] ABSTRACT

A vehicle seat assembly includes an aluminum lower seat frame with first and second side supports having a thickness of less than four mm throughout a substantial portion thereof. The seat back frame is pivotally connected to the lower seat frame and comprises a contoured structural reaction injection molded (SRIM) material. In an alternative embodiment, the back frame comprises a plurality of glass mat layers enclosed within a molded urethane material. Extra glass mat layers are provided in high stress concentration areas for added structural integrity.

8 Claims, 15 Drawing Sheets

OTHER PUBLICATIONS

SAE Technical Paper No. 930405, "Low Cycle Fatigue Behavior And Variable Amplitude Fatigue Life Calculations For An SRIM Polymer Matrix Composite", by A.R. Kallmeyer et al, Mar. 1–5, 1993, pp. 1–13.

SAE Technical Paper No. 930631, "PVC Covered Low Density RRIM Interior Automotive Trim Components and Their Recyclability", by Laura B. Weaver, Mar. 1–5, 1993, pp. 87–92.

SAE Technical Paper No. 930632, "Low Density Structural RIM II: High Productivity LD–SRIM", by Paul W. Mackey et al, Mar. 1–5, 1993, pp. 1–5.

SAE Technical Paper No. 940702, "LD–SRIM III: Progress In Lower Density Foam Composites", by Paul W. Mackey, Feb. 28–Mar. 3, 1994, pp. 1–6.

SAE Technical Paper No. 940703, "New Developments in Low Density RIM Composites for Interior Trim", by Laura B. Weaver et al, Feb. 28–Mar. 3, 1994, pp. 1–6.

SAE Technical Paper No. 950444, "Advances in Structural RIM Interior Trim Applications", by J.J. Katz et al, Feb. 27–Mar. 2, 1995, pp. 1–5.

SAE Technical Paper No. 950547, "Advancements in Low Cost Bumper Systems", by Kristen L. Parks et al, Feb. 27–Mar. 2, 1995, pp. 1–6.

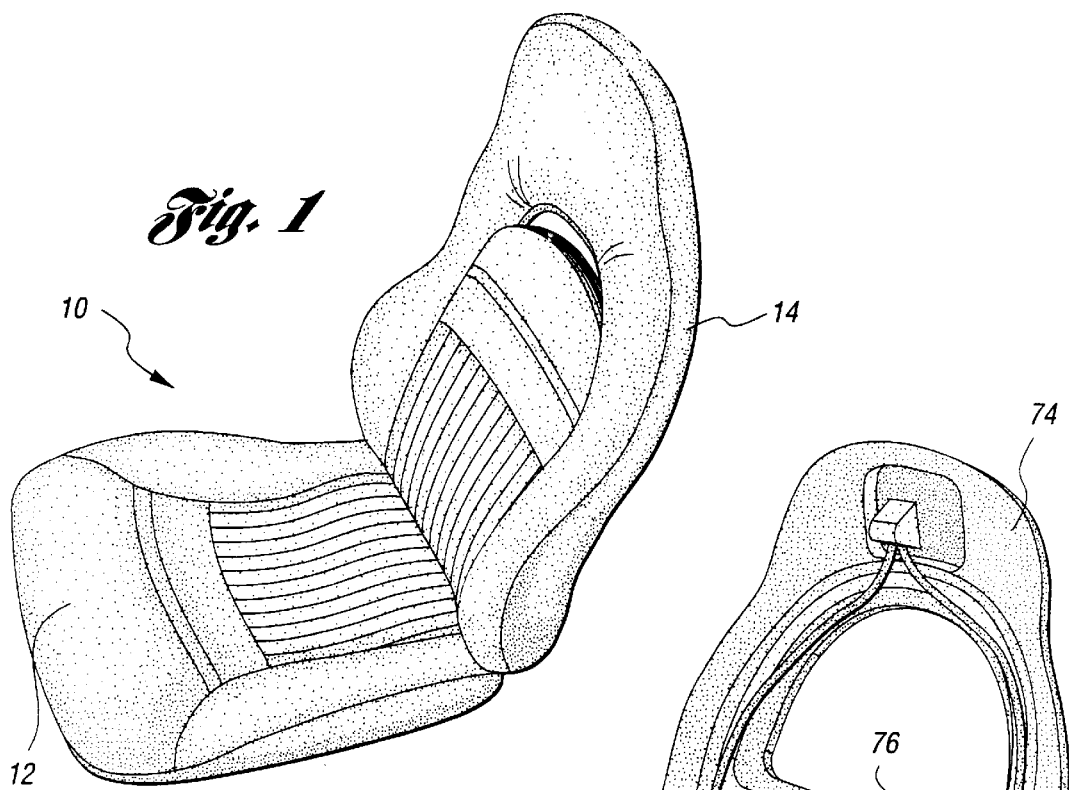
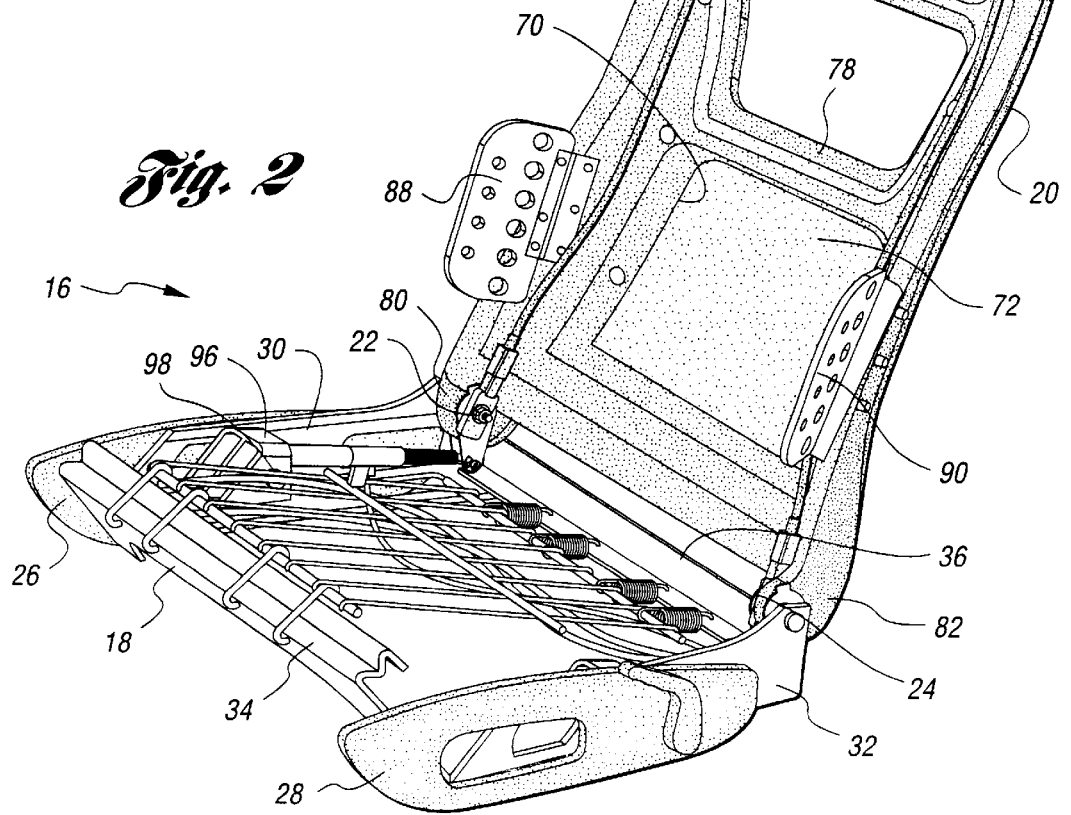

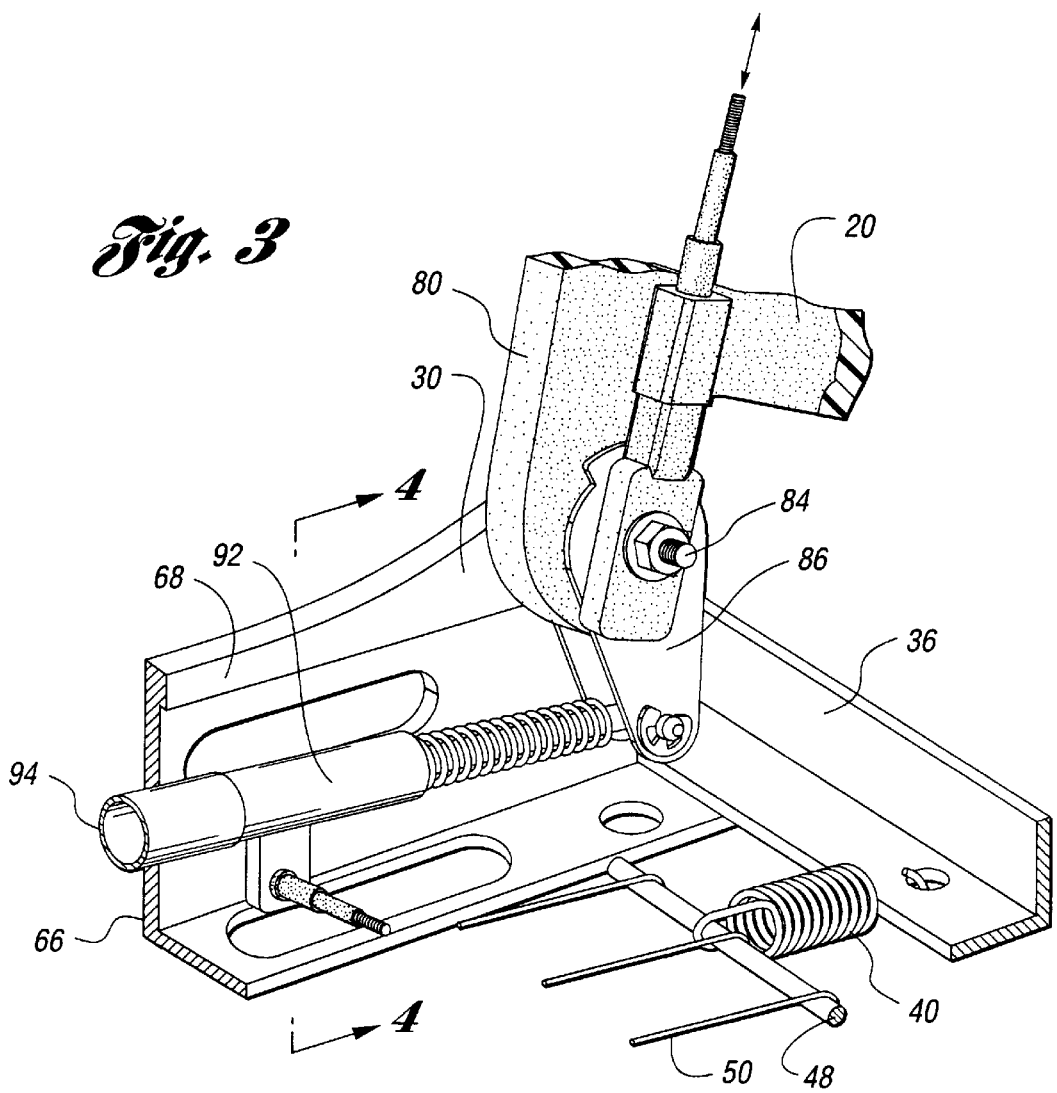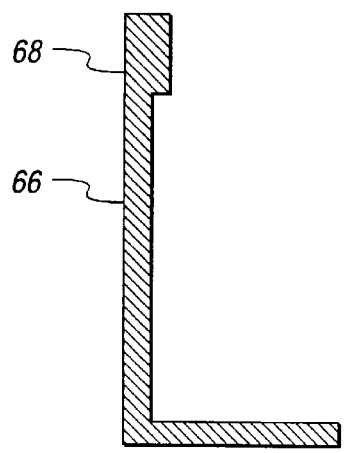

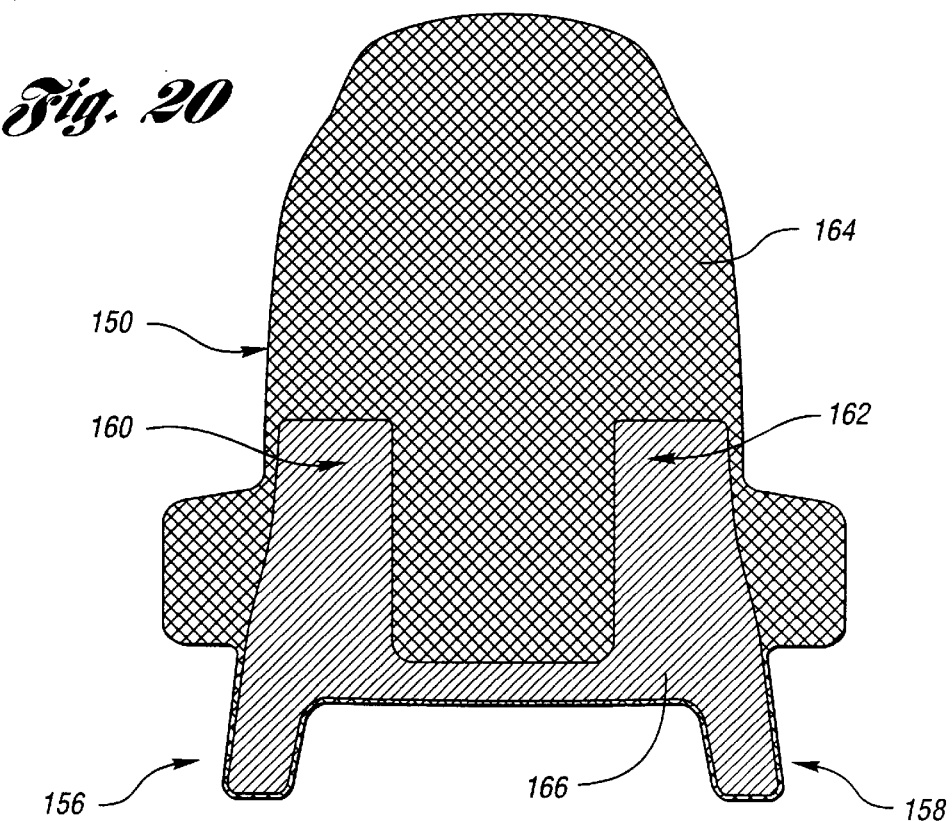
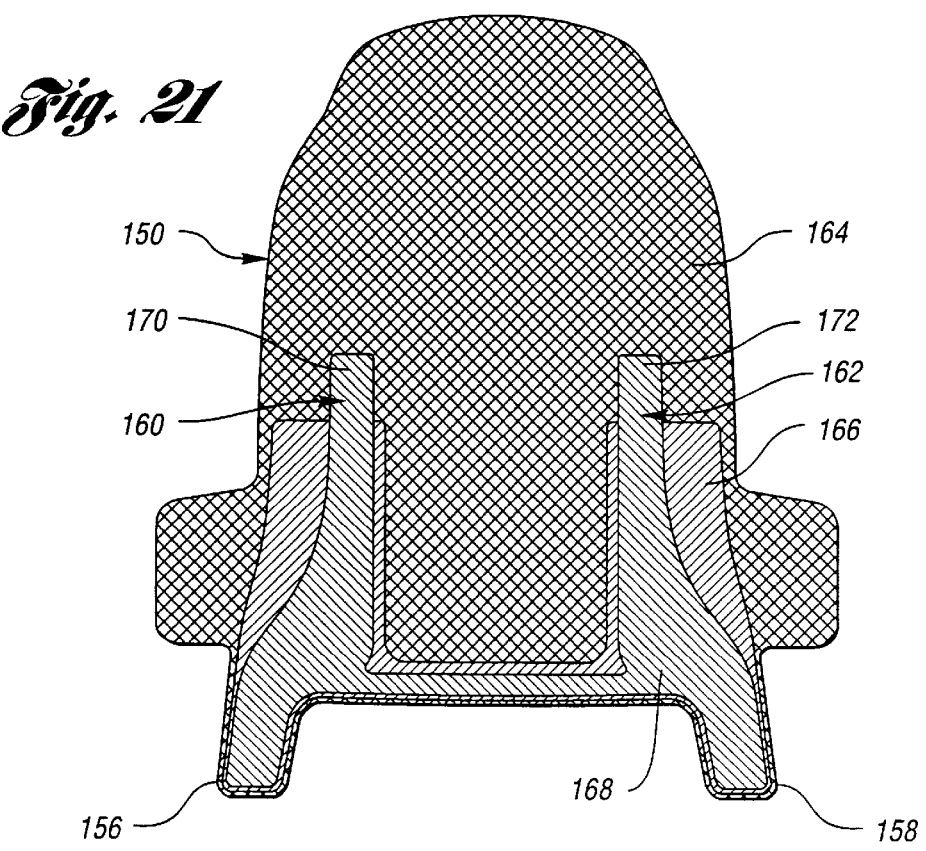

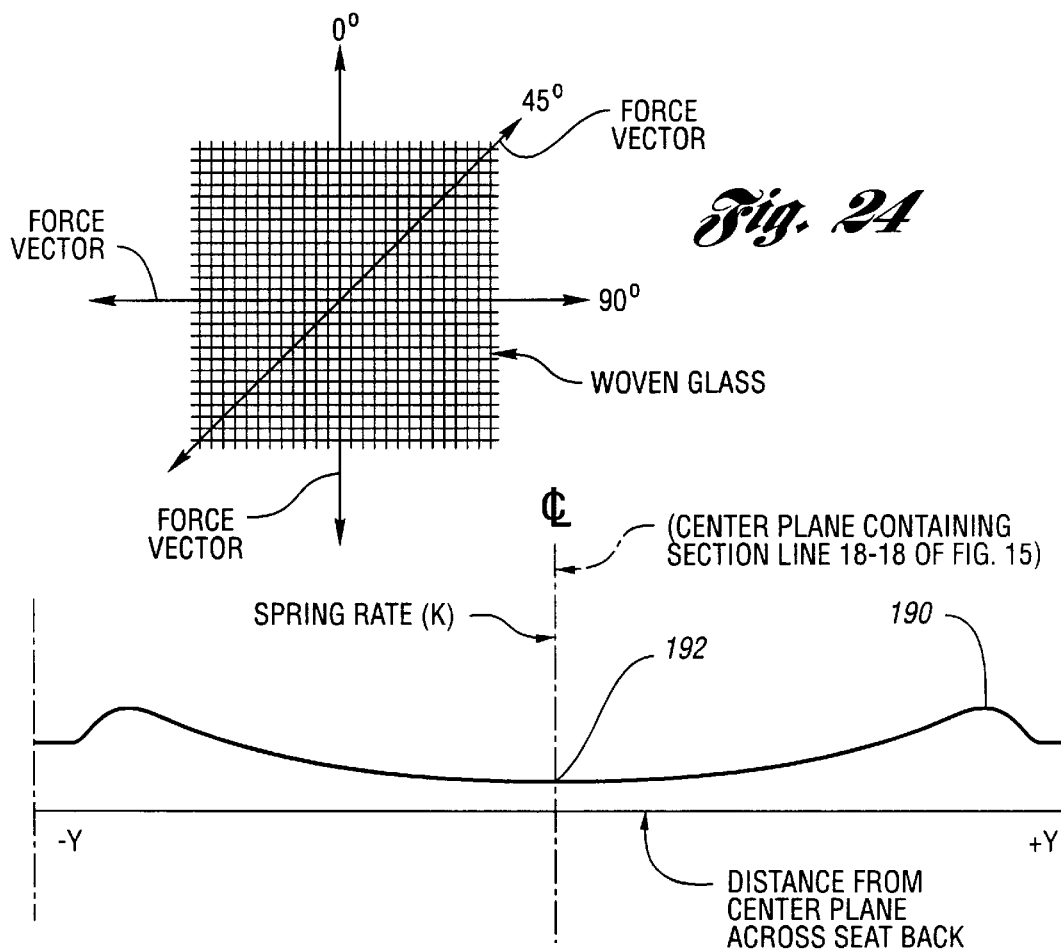
Fig. 24
Fig. 25
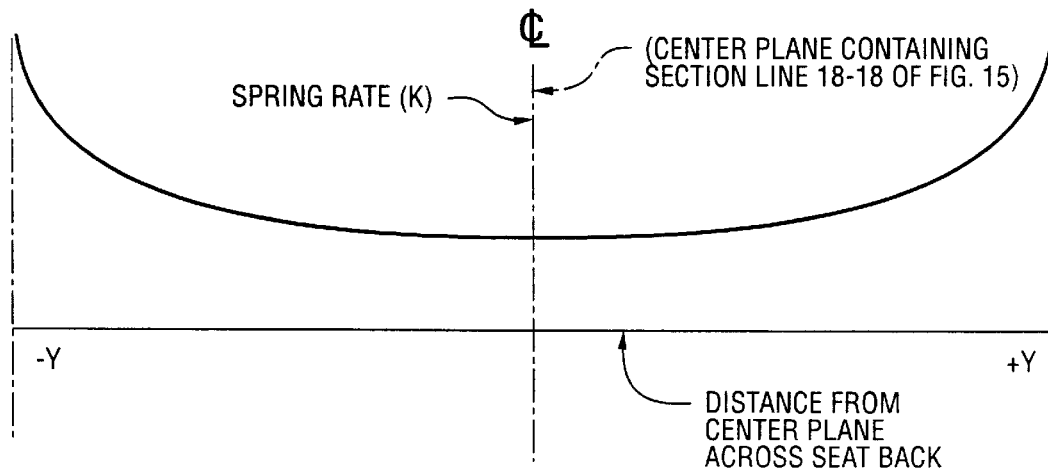
Fig. 26

| SEAT FEATURE | DESCRIPTION | CONTRIBUTION OF REQUIREMENT OF STANDARDS ACHEIVED BY AREA | | | | | | |
|---|---|---|---|---|---|---|---|---|
| | | A | B | C | D | E | F | G |
| BOTTOM RIB | | 3 | 8 | 9 | 10 | 8 | 3 | 9 |
| CENTER RIB | | 4 | 1 | 10 | 6 | 8 | 6 | 10 |
| TOP RIB | | 6 | 1 | 6 | 4 | 8 | 6 | 8 |
| FIRST TRANSITION | LEG TO LOWER PILLAR AREA | 7 | 9 | 10 | 9 | 8 | 7 | 10 |
| HALO | HEAD IMPACT AREA | 10 | 1 | 1 | 1 | 8 | 10 | 4 |
| LATERAL SUPPORT | PADDLE-SHAPED AREA | 1 | 2 | 2 | 2 | 8 | 1 | 2 |
| LEG | LOWEST PORTION OF FRAME | 8 | 10 | 10 | 10 | 8 | 8 | 10 |
| LOWER PILLAR | TRIM ATTACHMENT AREA | 7 | 7 | 9 | 7 | 8 | 7 | 9 |
| SECOND TRANSITION | MIDWAY AREA UP SEAT FRAME | 7 | 2 | 10 | 6 | 8 | 7 | 7 |
| PIVOT HOLE | ATTACHMENT POINT IN LEG | 7 | 7 | 10 | 7 | 1 | 7 | 10 |
| TARGET "A" | CENTER POINT, BOTTOM RIB | 3 | 6 | 9 | 9 | 8 | 3 | 9 |
| TARGET "B" | AREA ABOVE PIVOT HOLE | 7 | 10 | 10 | 10 | 8 | 7 | 10 |
| TARGET "C" | TOP OF THE LOWER PILLAR | 7 | 7 | 9 | 7 | 8 | 8 | 8 |
| TARGET "D" | CENTER AREA OF CENTER RIB | 4 | 1 | 10 | 5 | 8 | 6 | 10 |
| TARGET "E" | AREA ABOVE TOP RIB | 9 | 1 | 2 | 1 | 8 | 10 | 4 |

*Fig. 27*

| SEAT FEATURE | DESCRIPTION | LOADING DIRECTION | | | | | |
|---|---|---|---|---|---|---|---|
| | | X | Mx | Y | My | Z | Mz |
| BOTTOM RIB | | | | | | | ✓ |
| CENTER RIB | | ✓ | | | | | ✓ |
| TOP RIB | | | | | | | |
| FIRST TRANSITION | LEG TO LOWER PILLAR AREA | ✓ | | | ✓ | | |
| HALO | HEAD IMPACT AREA | ✓ | | | ✓ | | |
| LATERAL SUPPORT | PADDLE-SHAPED AREA | | | | | | |
| LEG | LOWEST PORTION OF FRAME | ✓ | | | ✓ | | |
| LOWER PILLAR | TRIM ATTACHMENT AREA | ✓ | | | ✓ | | |
| SECOND TRANSITION | MIDWAY AREA UP SEAT FRAME | ✓ | | | ✓ | | |
| PIVOT HOLE | ATTACHMENT POINT IN LEG | ✓ | | | ✓ | | |
| TARGET "A" | CENTER POINT, BOTTOM RIB | ✓ | | | | | ✓ |
| TARGET "B" | AREA ABOVE PIVOT HOLE | ✓ | | | ✓ | | |
| TARGET "C" | TOP OF THE LOWER PILLAR | ✓ | | | ✓ | | |
| TARGET "D" | CENTER AREA OF CENTER RIB | ✓ | | | | | ✓ |
| TARGET "E" | AREA ABOVE TOP RIB | ✓ | | | ✓ | | |

*Fig. 28*

| SEAT FEATURE | DESCRIPTION | ENERGY MANAGEMENT | | |
|---|---|---|---|---|
| | | CONDUCT ENERGY | CONVERT ENERGY | STORE/RELEASE ENERGY |
| BOTTOM RIB | | ▓ | | ▓ |
| CENTER RIB | | | ▓ | ▓ |
| TOP RIB | | | | ▓ |
| FIRST TRANSITION | LEG TO LOWER PILLAR AREA | ▓ | | |
| HALO | HEAD IMPACT AREA | ▓ | | ▓ |
| LATERAL SUPPORT | PADDLE-SHAPED AREA | ▓ | | |
| LEG | LOWEST PORTION OF FRAME | ▓ | | |
| LOWER PILLAR | TRIM ATTACHMENT AREA | ▓ | | |
| SECOND TRANSITION | MIDWAY AREA UP SEAT FRAME | ▓ | | ▓ |
| PIVOT HOLE | ATTACHMENT POINT IN LEG | ▓ | | |
| TARGET "A" | CENTER POINT, BOTTOM RIB | | | ▓ |
| TARGET "B" | AREA ABOVE PIVOT HOLE | ▓ | | |
| TARGET "C" | TOP OF THE LOWER PILLAR | ▓ | | ▓ |
| TARGET "D" | CENTER AREA OF CENTER RIB | | ▓ | |
| TARGET "E" | AREA ABOVE TOP RIB | ▓ | | ▓ |

Fig. 29

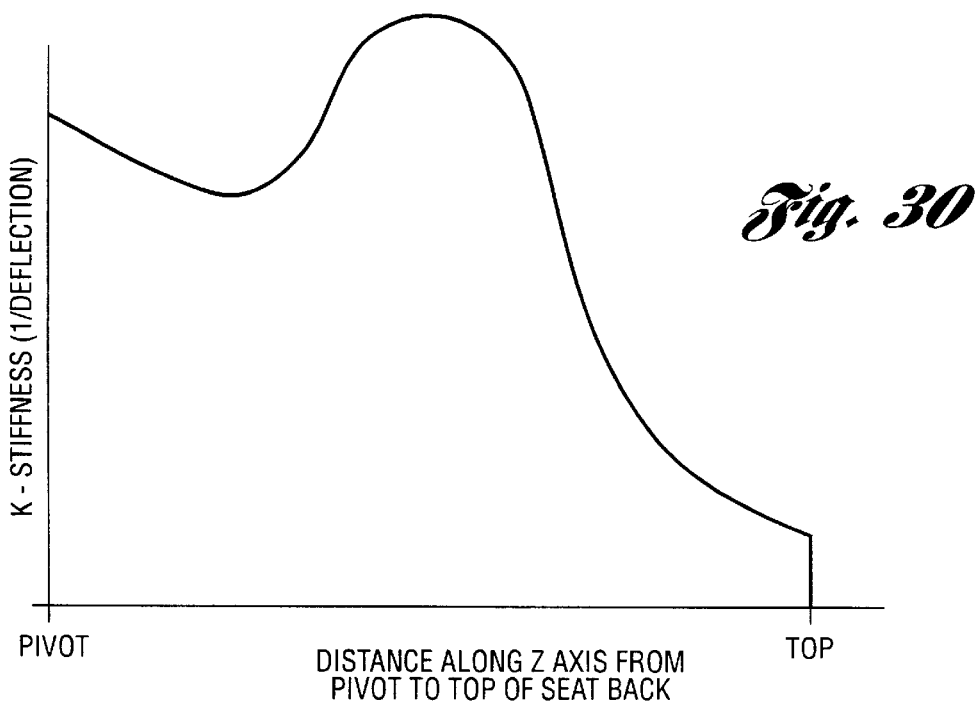

Fig. 30

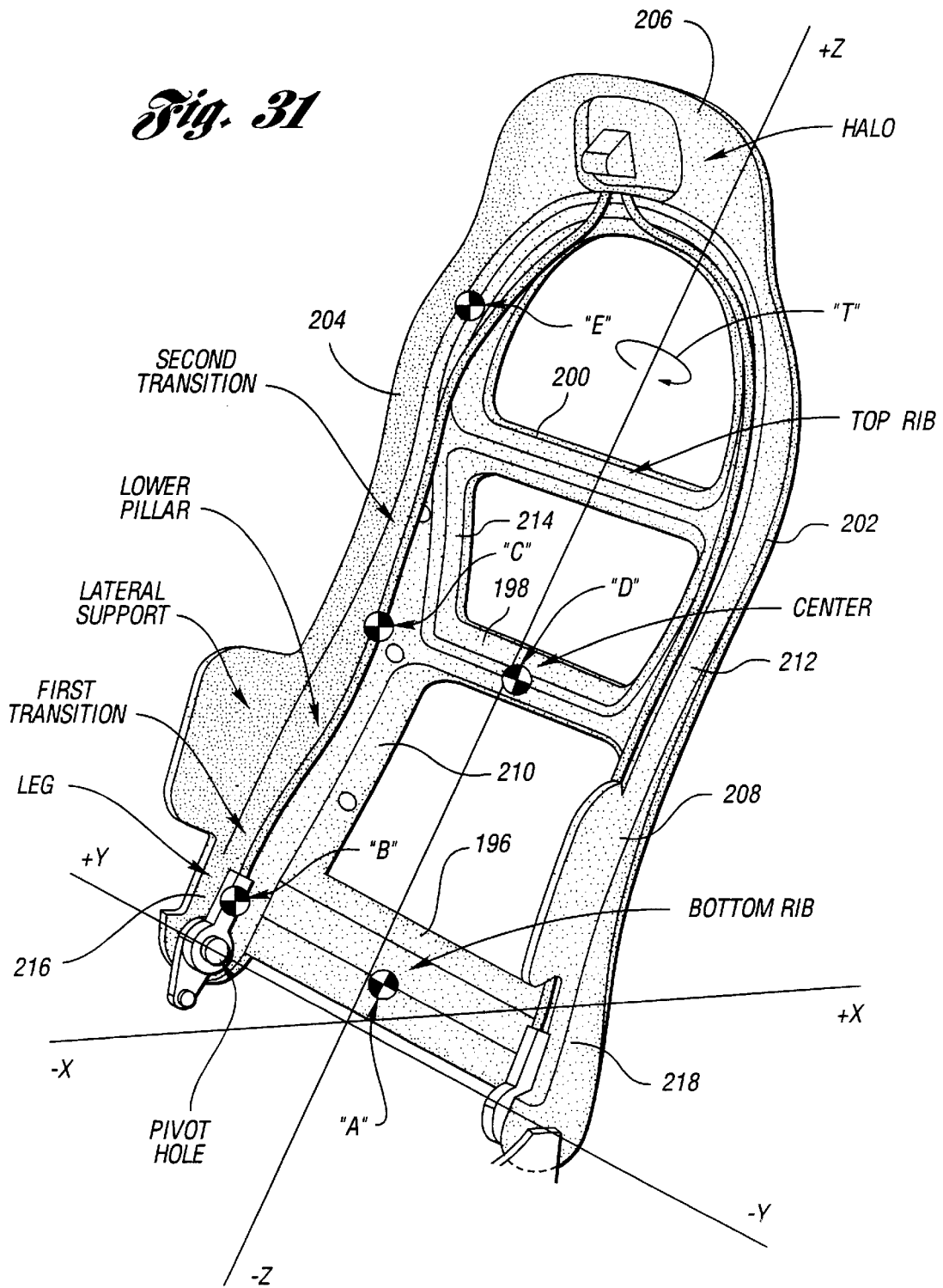

VEHICLE SEAT ASSEMBLY

CROSS-REFERENCE TO RELATED APPLICATION

This application is a continuation-in-part of U.S. patent application Ser. No. 08/840,412, filed Apr. 29, 1997, entitled "Vehicle Seat Assembly", now abandoned which is a continuation-in-part of U.S. patent application Ser. No. 08/705,198, filed Aug. 29, 1996, entitled "Vehicle Seat Assembly"now abandoned. Both of these applications are assigned to the assignee of the present application and are incorporated in the present application by reference.

TECHNICAL FIELD

The present invention relates to a vehicle seat assembly. More particularly, it relates to a vehicle seat assembly having a back frame formed of a polyurethane material with a plurality of glass mat layers enclosed therein.

BACKGROUND ART

In recent years, vehicle seat designs have become an important part of the overall vehicle design. Current vehicle seat designs require improved adjustability, functionality and comfort, which adds complexity to the design process. Universal seat back adjustment capability, for example, as well as lumbar support adjustment features have increased assembly costs and further complicate the design.

The desire for universal adjustment features, lumbar support features and improved comfort, as well as aesthetic appeal, heretofore has tended to inhibit current efforts in the industry to reduce weight for improved fuel economy. Vehicle seat designers, furthermore, now attempt to reduce weight of the seat assembly without increasing manufacturing costs.

Typically, steel or aluminum seat back frames are used in the design of a seat assembly. Such steel or aluminum seat back frames are not only heavy, but are also limited to certain structural design configurations because of their respective manufacturing processes. For example, aluminum alloy back frames typically comprise a bent tube, which is inherently limited to certain U-shapes.

Accordingly, it is an object of the invention to provide a vehicle seat assembly with improved design flexibility, reduced weight, aesthetic appeal and reduced manufacturing costs, without loss of adjustability.

SUMMARY OF THE INVENTION

The present invention is an improvement over prior art seat assembly designs in that it provides a vehicle seat assembly including a seat back frame comprising a contoured, high density, structural reaction injection molded material (SRIM), which is lighter and less expensive to manufacture than a steel or aluminum back frame. For example, the improved seat back frame of the invention may be 13 mm thick at the thickest location compared to an inch or more for a conventional seat back frame made of aluminum alloy.

In an alternative embodiment, the present invention provides a back frame comprising a plurality of glass mat layers formed generally in the shape of the back frame, with a polyurethane material molded over the glass mat layers. This configuration is also lighter and less expensive to manufacture than a steel or aluminum back frame. It also provides greater design flexibility in that the shape and contour of the back frame is limited only by the mold cavity shape. The seat back may be designed readily with a complex geometric shape without compromising its energy management capability. Extra glass mat layers are added in high stress concentration areas of the back frame for enhanced structural integrity. The glass mat layers may be easily cut to desired shapes and secured together prior to installation in the mold cavity for urethane injection.

For additional weight reduction, the lower seat frame comprises an aluminum material of a substantially reduced thickness.

Accordingly, an object of the invention is to provide a vehicle seat assembly with reduced weight and reduced manufacturing costs without loss of adjustability, and with improved design flexibility.

A further object of the invention is to provide a vehicle seat assembly comprising a back frame formed of a contoured structural reaction injection molded (SRIM) material.

Another object of the invention is to provide a seat back frame comprising a urethane material molded over a plurality of glass mat layers.

A seat back assembly for an automotive vehicle must be capable of controlling and managing energy generated by inertial forces (e.g., during vehicle impacts, for example, by a rear impact). The vehicle occupant creates a load or force on the seat back during a vehicle rear impact occurrence, and the energy of the reaction force from the seat frame attachments must be managed by the seat back construction. The invention effectively manages that energy by providing a unique balance of design characteristics that provide energy storage in the seat back construction, energy absorption and distribution of energy to the structural seat back support that is attached to the vehicle body.

Energy storage due to the reaction force exerted on the seat back during an impact occurrence is achieved by a spring effect at strategic locations of the seat back structure. The spring effect is variable from one seat back location to another in order to achieve a seat back design with optimum energy management.

The displacement of the seat back structure due to the spring characteristics of the seat back must be controlled by the so-called absorption characteristic. This energy-absorption feature is important, for example, if the seat occupant is to be protected from spring-back forces created by the seat back construction following displacement of the seat back during a high-energy vehicle impact. The absorption quality provides a so-called dashpot or damping effect which resists the normal tendency of the seat back construction to return to its original unstressed position following displacement of the seat back as a result of impact forces. This is accomplished by including in the SRIM material glass fibers which are arranged to fracture when a predetermined impact energy threshold is reached. The polyurethane material itself also is designed to provide a controlled break at specific failure points when that threshold value is present.

Efficient energy management for forces acting on the seat back further include structural features that effectively distribute impact energy forces from the seat back to rigid vehicle body structures. Such body structures may include seat mounting features and seat tracks.

The design of the seat back construction of the invention takes into consideration multiple variables, including a discrete spring rate for the SRIM material at selected locations on the seat back assembly defined by three orthogonal axes. These axes are a Z axis corresponding to the vertical center plane of the seat back, an X axis corresponding to a fore-and-aft center plane and a transverse Y axis extending from one seat back side to the other.

The spring rate at each of the strategic locations of the seat back assembly can be chosen during the design process so that a unique spring rate would be associated with each location with respect to each of the reference axes. Other variables available to the seat back designer are the number of glass mat layers and the thickness of each layer. Another variable is the placement of the glass mats. Still other variables are the directional orientation of the glass fibers in the glass mats, the density of the glass fibers and the length and thickness of the glass fibers.

The design of the seat back assembly involves the use of a woven glass threads of selected density which can be stretched a greater extent in a diagonal direction than in the directions corresponding to the directions of the threads of the woven material for any given force that might be applied to the woven material. The orientation of the woven material can be selected for various strategic locations in the seat back assembly in order to tailor the spring effect, the dashpot or damping effect and the rigidity of the SRIM material.

Each of the variables that is available to the seat back designer can be adjusted in accordance with a predetermined recipe that would be required, for example, to meet any given set of automotive vehicle safety standards.

It is known in the art to use low density SRIM materials for various automotive applications such as molded trim and bumpers. Examples of such prior art applications are described in SAE Technical Papers 900074, 920497 and 950547. The use of stacked glass fiber mats is described in SAE Technical Paper No. 930174. The material used in the present invention, in contrast with such prior art examples, is a high density polyurethane, glass-reinforced SRIM material having design characteristics that can be controlled as desired to meet localized energy management requirements. This is done at key design locations where energy management is required for specific structural characteristics. The glass reinforcement comprises glass chop material with random glass fiber orientation at the interior region of the polyurethane and woven glass material with glass fibers having controlled directional orientation near the surface of the seat back.

The SRIM material used in the seat back of the invention replaces the steel seat frame used in many prior art constructions. This reduces, by comparison, the weight of the seat assembly and adapts the design for an injection molding process to obtain a complete, unitary seat back.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 1 shows a perspective view of a vehicle seat assembly in accordance with the present invention;

FIG. 2 shows a perspective view of a vehicle seat frame assembly in accordance with the present invention;

FIG. 3 shows a cut-away perspective view of a lower seat frame and back frame in accordance with the present invention;

FIG. 4 shows a vertical cross-sectional view taken at line 4—4 of FIG. 3;

FIG. 20 shows a schematic plan view of first and second glass mat layers arranged to form a seat back frame shape in accordance with the embodiment shown in FIG. 19;

FIG. 21 shows a schematic plan view of first, second and third glass mat layers in accordance with the embodiment shown in FIG. 19;

FIG. 24 is a schematic representation of a woven glass mat having glass threads of a selected density and thickness;

FIG. 25 is a graph showing the variation of the spring rate for the SRIM material along the length of the seat back;

FIG. 26 is a graph showing the spring rate for the SRIM material at the lowermost location of the seat back relative to the X reference axis;

FIG. 27 is a chart that demonstrates the contributions at various locations of the seat back assembly to the total energy requirements imposed by each of a variety of safety standards that are used in the automotive industry;

FIG. 28 is a chart that lists the relative importance of the multiple load directions during energy management of high impact forces at each of several critical locations of the seat back assembly;

FIG. 29 is a chart showing the energy management function at various seat locations of the seat assembly;

FIG. 30 is a chart illustrating the stiffness of a seat back assembly of the invention at various vertical reference points along the Z reference axis;

FIG. 31 is an assembly view in schematic orthogonal form in which various critical seat back locations are identified with reference to the three coordinate axes.

DETAILED DESCRIPTION OF THE PREFERRED EMBODIMENT

Figure 5:
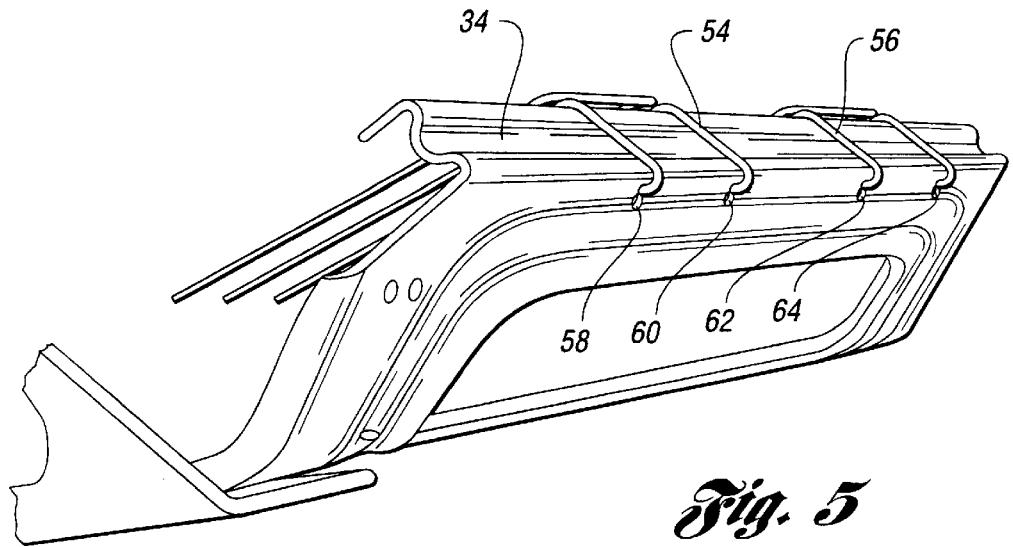
FIG. 5 shows a cut-away perspective view of a lower seat frame assembly in accordance with the present invention.

FIG. 1 shows a vehicle seat assembly 10 in accordance with the present invention. The seat assembly includes a lower seat 12 and a seat back 14. In FIG. 2, a vehicle seat support frame assembly 16 is shown. The support frame assembly 16 includes a lower seat frame 18 and a seat back frame 20 pivotally connected to the lower seat frame 18 at the pivot joints 22, 24 near the lumbar region of the seat back. Plastic side shield 28 covers opposing sides of the lower seat frame 18.

The lower seat frame 18 comprises first and second side supports 30, 32 connected at opposing ends to front and rear support members 34, 36, respectively. These components may be riveted and also welded for enhanced strength. For varying the seat width for different vehicles, the front and rear support members 34, 36 may be cut to the appropriate length and attached to the side supports 30, 32 for inexpensive switching between vehicle models.

Figure 6:
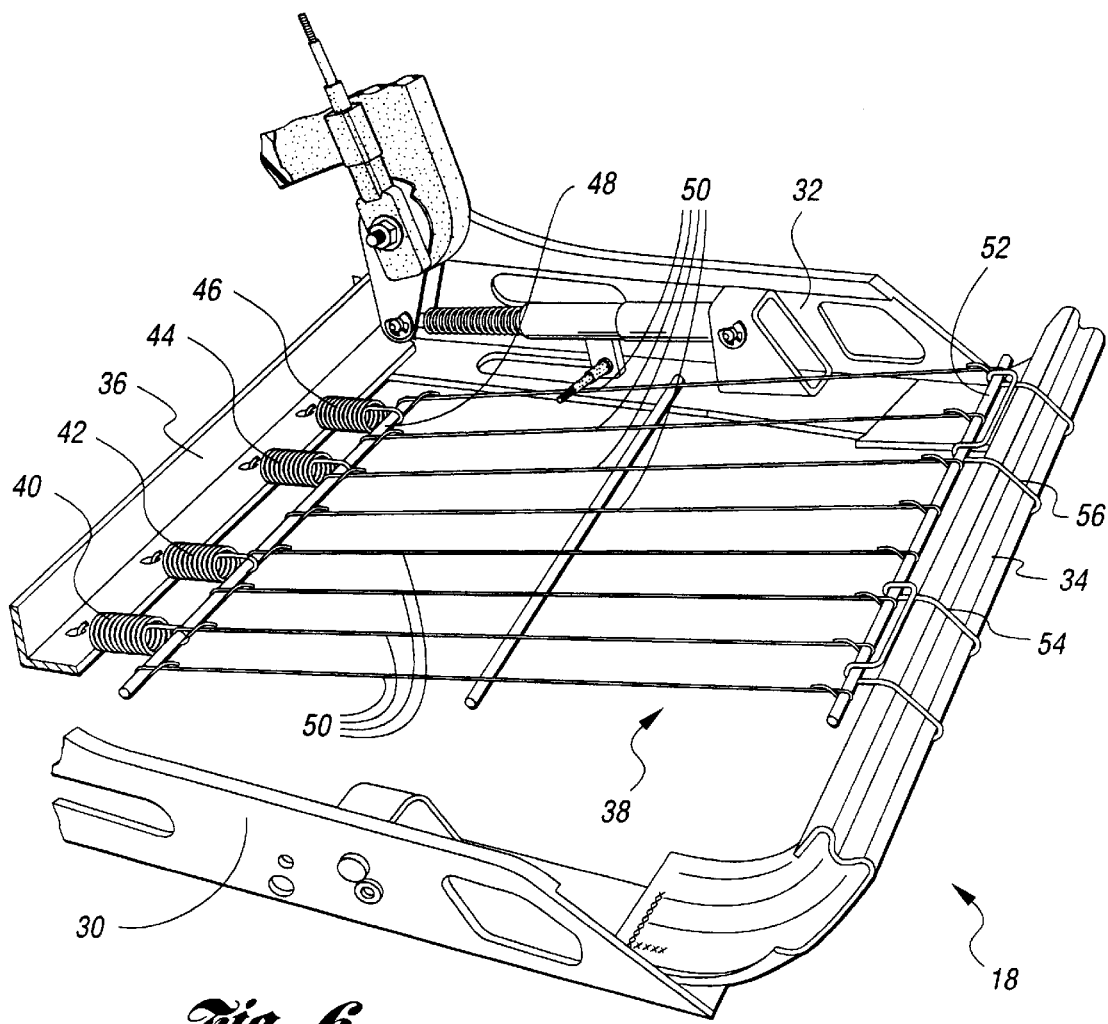
FIG. 6 shows a reverse perspective view of a lower seat frame assembly in accordance with the present invention.

As shown in FIGS. 5 and 6, the lower seat frame 18 holds a cushion support assembly 38 (also known as a "flexilator"). The cushion support assembly 38 includes a plurality of springs 40, 42, 44, 46 secured to the rear support member 36. A rear support rod 48 is secured to the springs 40, 42, 44, 46, and a plurality of support wires 50 is connected to the rod 48. The support wires 50 extend to the front support rod 52, and the retainer clips 54, 56 secure the front support rod 52 to the front support member 34 by engaging the apertures 58, 60, 62, 64 formed in the front support member 34, as shown in FIG. 5.

As shown in FIGS. 2, 3 and 4, the side support members 30, 32 preferably comprise an extruded 6061-T6 aluminum alloy having a thin portion 66 for reduced weight. This thin portion 66 has a thickness of approximately 3 mm. For added structural stiffness, an upper edge portion 68 is provided with increased thickness. The upper edge portion 68 has a thickness of approximately 6 mm.

As shown in FIG. 2, the seat back frame 20 includes at least one aperture 70 formed therethrough for cooperation with a lumbar support bag 72. The seat back frame 20, which is contoured to conform to the normal spine profile of an occupant, includes a head support portion 74. The support ribs 76, 78 provide crash test performance enhancement.

As shown in FIG. 3, the seat back frame 20 includes attachment tabs 80, 82 (see FIG. 2) having a thickness of approximately 14 mm to provide a structurally sound hinge area. An attachment bolt 84 pivotally connects the tab 80 to the support bracket 86. The remainder of the seat back frame 20 comprises a thickness of approximately 4 mm for reduced weight. A runner (not shown) may be provided vertically through the center of the back frame 20 to aid in the flow of the SRIM material during the molding process.

As shown in FIG. 2, side bolster flip paddles 88, 90 are provided in cooperation with inflatable bladders (not shown) for side bolster adjustment.

As shown in FIG. 3, the recliner mechanism 92 is provided with a steel sleeve 94 to prevent the recliner from buckling under rearward load. The steel sleeve 94 is secured to the recliner bracket 96 by a pivot pin 98, as shown in FIG. 2.

The SRIM back frame 20 is described in more detail with reference to FIG. 7. The overall seat support frame assembly 16 (shown in FIG. 2) most effectively dissipates energy if the seat back frame 20 remains substantially rigid. With the seat back frame 20 substantially rigid in a high energy rear impact, energy is transferred from the back frame 20 through the recliner mechanism 92, through the pivot pin 98 and recliner bracket 96, and to the lower seat frame 18. This energy may then be dissipated into the seat adjuster track (not shown), which is provided with a predicted yield point for proper energy dissipation. For this energy dissipation to occur, the seat back frame 20 must be maintained substantially rigid.

Figure 7:
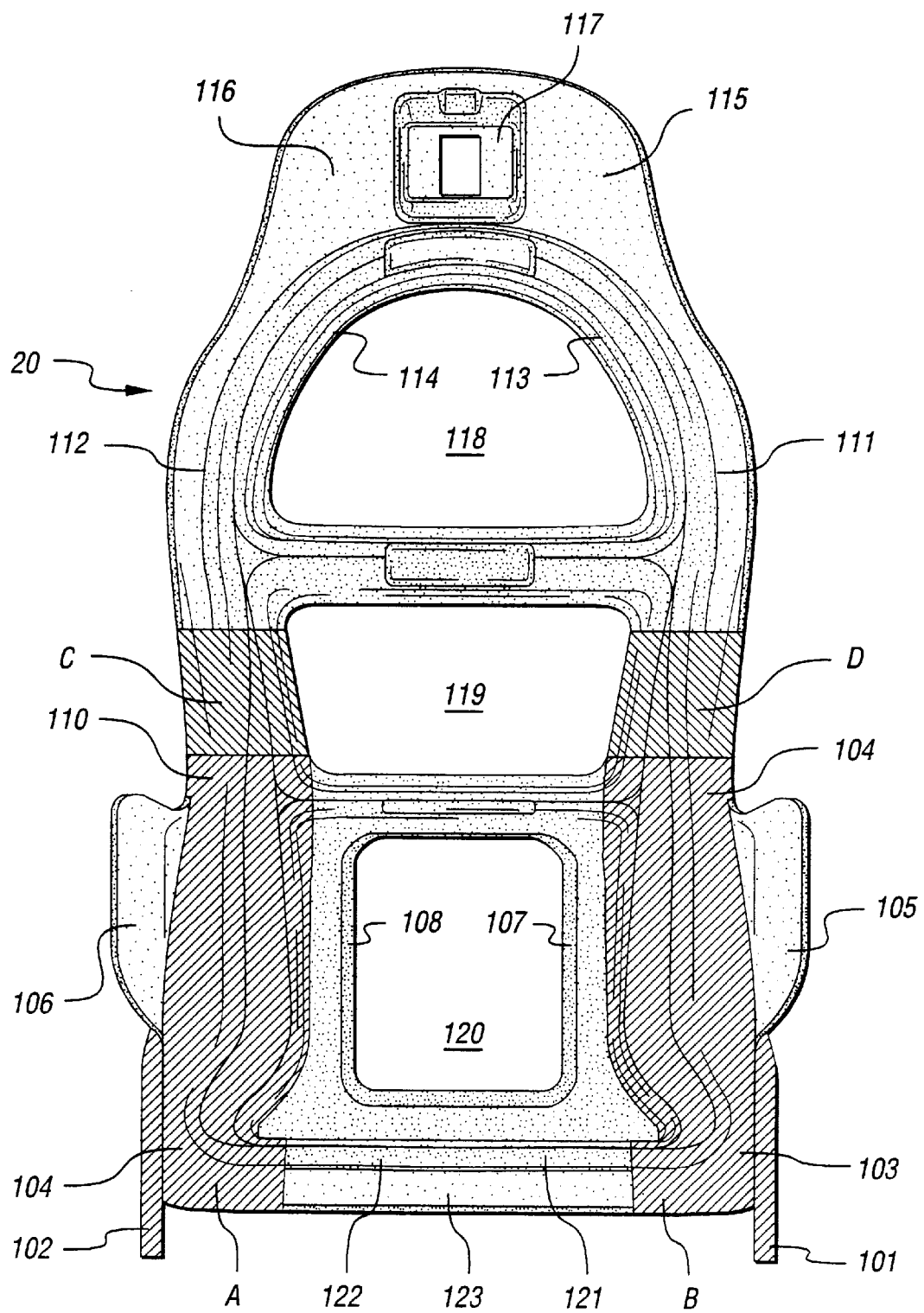
FIG. 7 shows a schematic plan view of a seat back frame illustrating selected glass fill locations.
Figure 8:
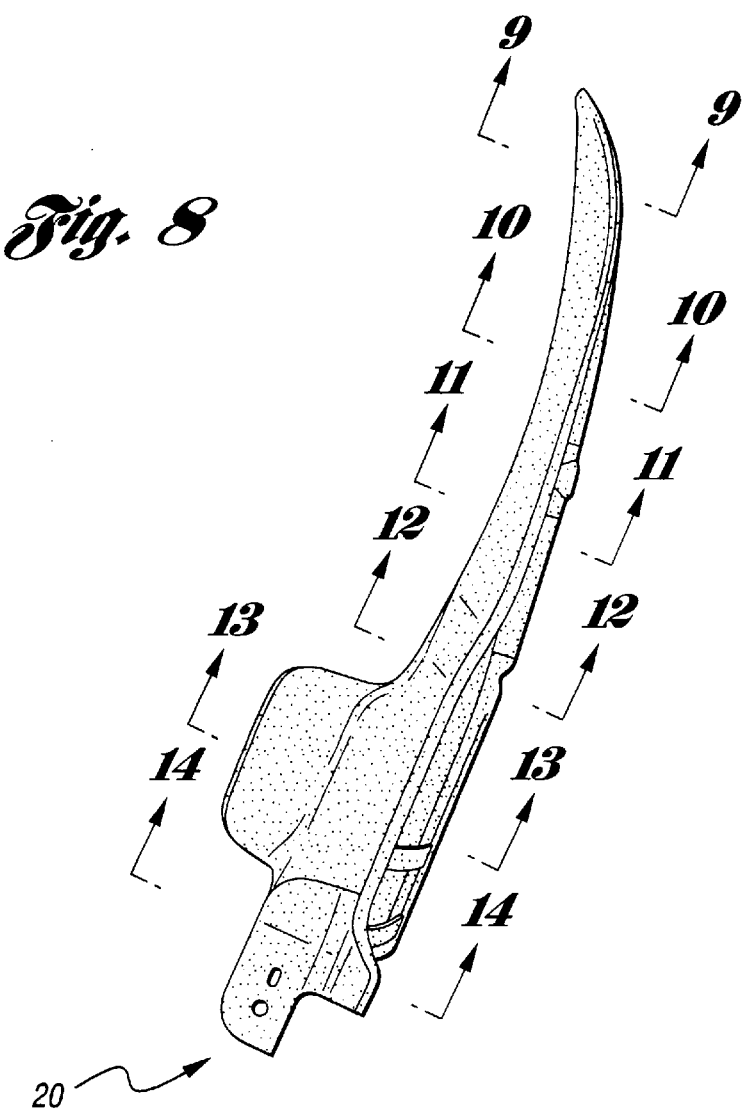
FIG. 8 shows a side view of the seat back frame.

In order to maintain the seat back frame 20 substantially rigid, a double glass mat is situated in the cross hatched areas marked A and B in FIG. 7. A single layer of glass mat or woven material is placed in the cross hatched areas marked C and D in FIG. 7. These glass mats are held in position by a binder, and random fibers (also known as chop) are blown or laid into the rest of the mold cavity in which the part will be formed. Once the glass mats and chop have been installed in the mold, the mold is closed and a polyurethane is injected into the mold, at which point the mold is held closed as the material cures. With the double matting in areas A and B indicated in FIG. 7, the seat back frame 20 is capable of maintaining a substantially rigid position under significant load conditions. The matting need only cover approximately one-half of the vertical length of the seat back frame 20 to attain the desired rigidity. The SRIM material preferably comprises approximately sixty percent glass.

The areas indicated in FIG. 7 with their respective mat and chop contents are described in the charts below:

| Feet (101,102) | |
| --- | --- |
| Area | 0.11 ft$^2$ |
| Mat | 0.59 oz |
| Chop | 4.70 oz |
| Above Feet (103,104) | |
| Area | 0.07 ft$^2$ |
| Mat | 0.35 oz |
| Chop | 1.89 oz |
| Spine (107,108) | |
| Area | 0.31 ft$^2$ |
| Mat | 1.67 oz |
| Chop | 4.72 oz |

| Balance (109,110,A,B,C,D) | |
| --- | --- |
| Double (A,B) | Single (C,D) |
| Area  0.44 ft$^2$ | 0.12 ft$^2$ |
| Mat   2.35 oz | 0.32 oz |
| Chop  3.65 oz | 0.91 oz |

| Punchouts, Top & Paddles | |
| --- | --- |
| (118,119,120) | (105,106,111–117) |
| Area  1.19 ft$^2$ | 2.13 ft$^2$ |
| Mat   0.00 oz | 0.00 oz |
| Chop  3.25 oz | 21.81 oz |

| Bottom Rib | |
| --- | --- |
| (121,122) | Bottom (123) |
| Area  0.06 ft$^2$ | Area  0.16 ft$^2$ |
| Mat   0.00 oz | Mat   0.00 oz |
| Chop  0.85 oz | Chop  0.30 oz |

FIGS. 8–18 illustrate the contour of the seat back frame 20 in the various sectional views. This contour provides added rigidity to the back frame 20.

Referring to FIGS. 19–23, an alternative embodiment of a back frame in accordance with the present invention is illustrated. The alternative back frame assembly 150 is shown in the schematic perspective view of FIG. 19. This embodiment comprises a plurality of glass mat layers 152, which are injection molded within a polyurethane material 154. The configuration of the glass mat layers 152, as described below with reference to FIGS. 20–23, is arranged to provide enhanced structural integrity in potentially high stress concentration areas of the back frame assembly 150. For example, the back frame assembly 150 comprises lower attachment portions 156, 158 where the back frame assembly 150 is attached to a lower seat frame. Because this is typically a high stress concentration area, additional glass mat layers are provided for added strength. Additionally, the back frame assembly 150 comprises side curvature portions 160, 162 extending longitudinally along opposing sides of the back frame assembly 150. The side curvature portions 160, 162 are also areas of expected high stress concentration. Extra glass mat layers thus are provided for additional strength at those areas.

The glass mat layers 152 are secured together and installed in a cavity of an injection molding tool, and polyurethane is injected into the mold to enclose the glass mat layers and to form the back frame assembly 150.

The frame assembly 150 can be formed with punch-out openings as one of the final manufacturing steps. These openings are seen in FIG. 31 at a lower lumbar location, an intermediate location adjacent the second transition, and an upper location near the halo. Corresponding openings are seen in FIG. 2. These openings will not compromise the structural integrity of the seat back.

The configuration of the glass mat layers 152 may be understood by referring to FIGS. 20–23. As seen in FIG. 20, the glass mat layers 152 comprise a first glass mat layer 164 formed generally in the shape of the back frame. It has first and second lower attachment portions 156, 158, and first and second side curvature portions 160', 162' extending longitudinally along opposing sides. The first glass mat layer 164 preferably comprises a die-cut mat of woven material commonly called woven roven or Rovicore. The mat consists of a two-ounce/square foot layer of glass, a layer of polypropylene-spun fiber, and another two-ounce/square foot layer of glass. These layers are stitched together. The polypropylene-spun fiber allows the polyurethane to flow between the fiberglass layers, thus providing an even flow of polyurethane, and higher strength per ounce weight of glass. In the areas where torsional stability is affected, additional layers of glass are added.

A second glass mat layer 166 is installed, as shown in FIG. 20, over the first glass mat layer 164. The second glass mat layer comprises a four-ounce/square foot needled glass mat. It extends from the lower attachment portions 156, 158 to the side curvature portions 160, 162. In an effort to improve urethane flow, the additional layers are transitioned in size to reduce abrupt changes in thickness.

As seen in FIG. 21, a third glass mat layer 168 is installed over the second glass mat layer 166. The third glass mat layer 168 also comprises a four-ounce/square foot needled glass mat. The third glass mat layer, which extends from the lower attachment portions 156, 158, includes arms 170, 172 which extend along the first and second side curvature portions 160, 162 of the back frame assembly 150.

Figure 22:
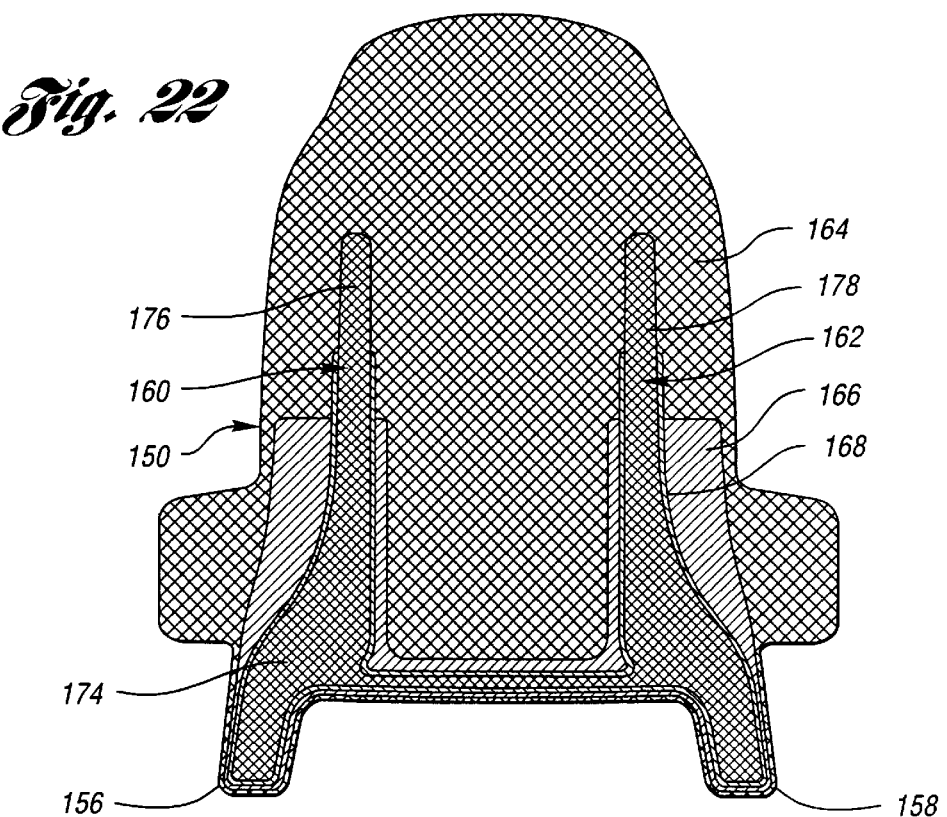
FIG. 22 shows a schematic plan view of first, second, third and fourth glass mat layers in accordance with the embodiment shown in FIG. 19.

Referring to FIG. 22, a fourth glass mat layer 174 is installed over the third glass mat layer 168, and extends from the lower attachment portions 156, 158. It includes legs 176, 178 extending farther along the side curvature portions 160, 162. This fourth glass mat layer 174 also comprises a four-ounce/square foot needled glass mat.

Figure 23:
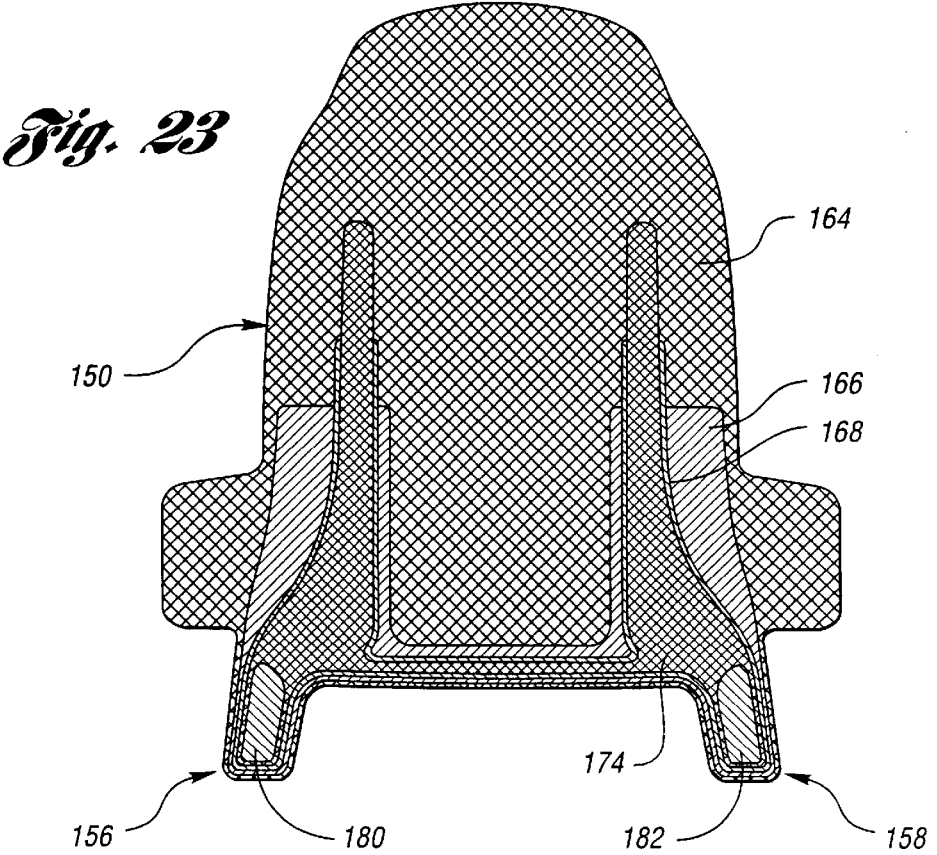
FIG. 23 shows a schematic plan view of first, second, third, fourth, fifth, and sixth glass mat layers in accordance with the embodiment shown in FIG. 19.

Referring to FIG. 23, fifth and sixth glass mat layers 180, 182 are added to the lower attachment portions 156, 158 for improved structural integrity in those areas. Preferably, the fifth and sixth glass mat layers 180, 182 comprise a two-ounce/square foot woven roven or Rovicore mat, which includes opposing layers of glass with a layer of polypropylene-spun fiber disposed therebetween.

The various glass mat layers may be stapled or stitched together, and then the glass mat layer assembly is installed in a mold cavity for injection of urethane. Of course, the glass mat layer configuration could vary, as well as the back frame configuration. However, it is important that extra glass mat layers be added in suspected high stress concentration areas of the back frame. An optimum strength and minimum mass design consists of woven glass at outermost locations near the surface of the seat back. The woven glass is specifically oriented to balance the design requirements with respect to spring rate, energy absorption and energy distribution. Certain middle portions of the first glass mat layer may be removed or opened to obtain the back frame configuration illustrated in FIG. 19. These are lightening openings which correspond to openings shown at 118, 119 and 120 in FIG. 7. This can be done without compromising strength and energy-absorbing characteristics.

As previously mentioned, the glass mats may comprise layers of woven material, referred to in the industry as woven roven or Rovicore, together with a companion layer of chop. The woven material has a linear orientation of the glass fibers, whereas the chop has a random orientation throughout the layer. The thicknesses of the woven layer and the chop layer can be varied as desired to satisfy the energy management requirements. Further, the density of the glass may be varied. In a typical embodiment of the invention, the woven material would be located relatively close to the surface of the back frame, whereas the chop material would be located at an innermost location.

FIG. 24 shows a piece of woven glass material with vectors indicating directional forces acting on it during a high-energy impact occurrence. The vectors produce the variations in the flexibility of the woven roven material when the force direction changes. There is substantially less stiffness and more deformation per unit force in a direction 45° from the direction of the woven threads of the material than there is in the direction of the woven threads. Thus, the stiffness of the back frame at a given location can be increased or decreased by orienting the woven roven material so that the stiffness of the back frame can be controlled.

Although the chop material with a random orientation of the glass fibers does not exhibit the directional strength characteristics of the woven roven material, the energy management of a seat back is not compromised if chop material is used and if the chop material is located toward the interior of the seat back. As explained previously, the polyurethane resin is injected over the mats after the glass mats are strategically placed in the mold.

FIG. 25 shows a plot of the spring rate for a seat back at a location near the top of the seat back. For example, the plot of FIG. 25 represents the spring rate characteristics for the section of the seat back illustrated in FIG. 10.

Figure 10:
FIG. 10 shows a sectional view of the seat back frame taken at line 10—10 of FIG. 8.
Figure 11:
FIG. 11 shows a sectional view of the seat back frame taken at line 11—11 of FIG. 8.
Figure 12:
FIG. 12 shows a sectional view of the seat back frame taken at line 12—12 of FIG. 8.
Figure 13:
FIG. 13 shows a sectional view of the seat back frame taken at line 13—13 of FIG. 8.

The plot of FIG. 25 shows the spring rate of the seat back measured at lateral locations across the seat back for seat back loads in a fore-and-aft direction. A low displacement of the seat back is characterized by a higher spring rate, as indicated at 190. The lowest spring rate occurs at maximum displacement, as indicated at 192. The variation of the spring rate across the seat back is achieved by the strategic design of the seat back frame. Lateral margins at each of several locations are indicated in FIGS. 10–14. As seen in FIG. 10, the lateral margins include ribs as shown at 194 and 195 which provide for a non-linear spring rate as the seat back deflects in a fore-and-aft direction.

In contrast to the spring rate illustrated in FIG. 25, the corresponding plot for the spring rate at the lower portion of the seat back is illustrated in FIG. 26. The spring rate of FIG. 26 corresponds generally to the seat back at the section of FIG. 14, where the thickness of the seat back is substantially greater than the thickness at the sections of FIGS. 9 and 10.

Figure 9:
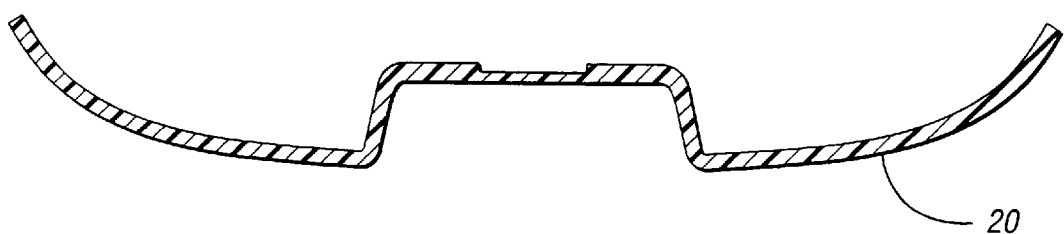
FIG. 9 shows a cross-sectional view of the seat back frame taken at line 9—9 of FIG. 8.
Figure 14:
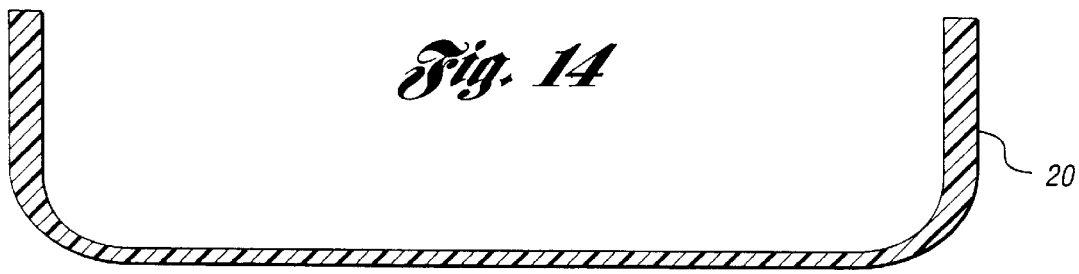
FIG. 14 shows a sectional view of the seat back frame taken at line 14—14 of FIG. 8.
Figure 15:
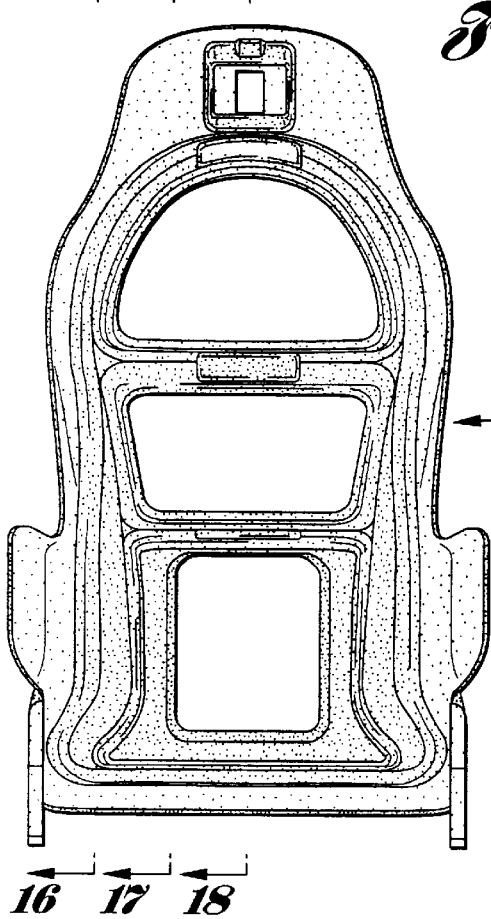
FIG. 15 shows a front plan view of a seat back frame corresponding to the seat back frame of FIG. 7.

The ribs 194 and 195 progressively decrease in height as the location of the seat back section changes from the upper position of FIG. 9 to the lower position of FIG. 14. In FIG. 14, the ribs 194 and 195 are substantially eliminated. The edges of the seat back at the location of the section of FIG. 14, however, are thickened relative to the edges of the seat back of FIG. 10. The configuration illustrated in the sectional view of FIG. 14 thus has a higher K factor (spring rate) than the corresponding K factor of FIG. 10. The K factors for the intermediate sections 11, 12 and 13 would be of a value between the K factors for the seat back portions at sections shown in FIGS. 10 and 14.

The ability of the seat back to store energy as a result of the spring characteristics described in the preceding paragraph must be matched with an energy absorption characteristic. This is achieved by the plastic deformation of the seat back material as the glass fibers and the polyurethane fracture due to bending stresses developed during a high energy impact event.

Figure 16:
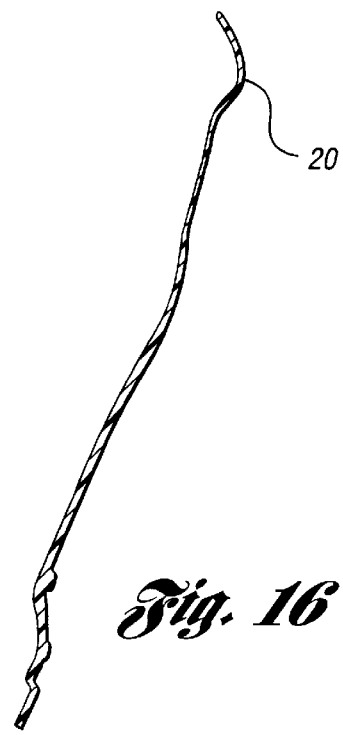
FIG. 16 shows a sectional view of the seat back frame taken at line 16—16 of FIG. 15.
Figure 17:
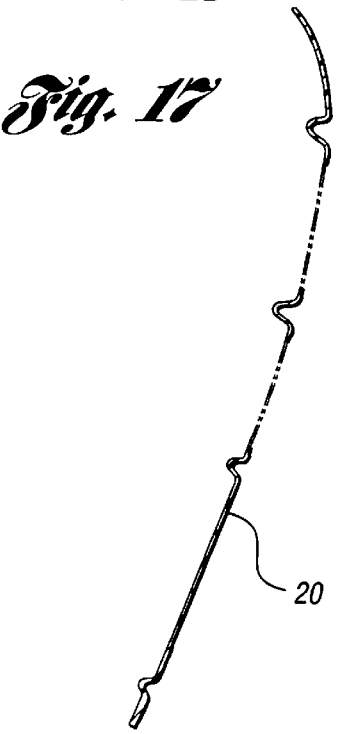
FIG. 17 shows a sectional view of the seat back frame taken at line 17—17 of FIG. 15.
Figure 18:
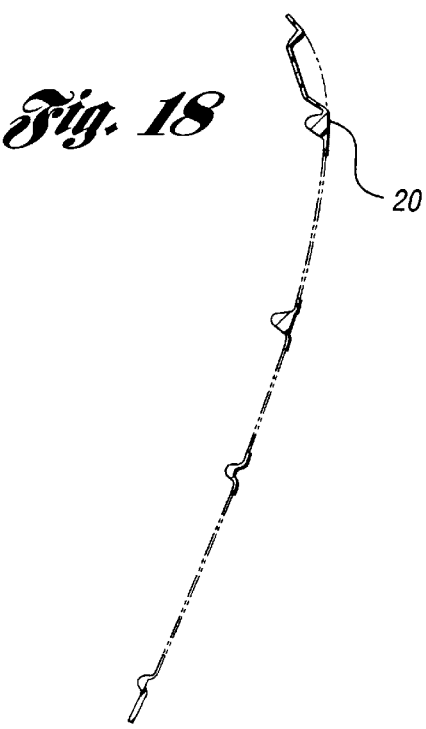
FIG. 18 shows a sectional view of the seat back frame taken at line 18—18 of FIG. 15.
Figure 19:
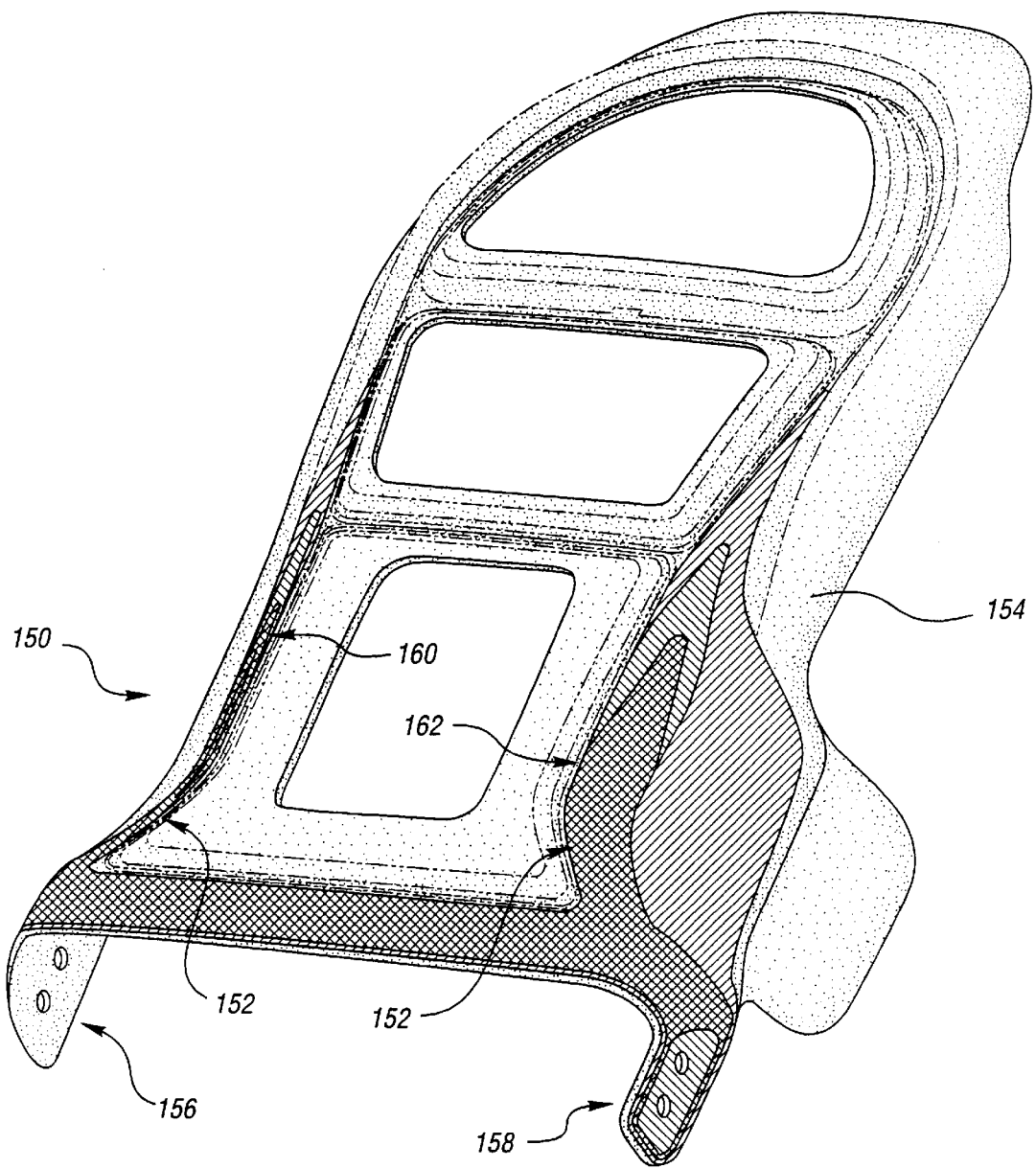
FIG. 19 shows a partially cut-away perspective rear view of a vehicle seat back frame in accordance with one embodiment of the present invention.
Figure 32:
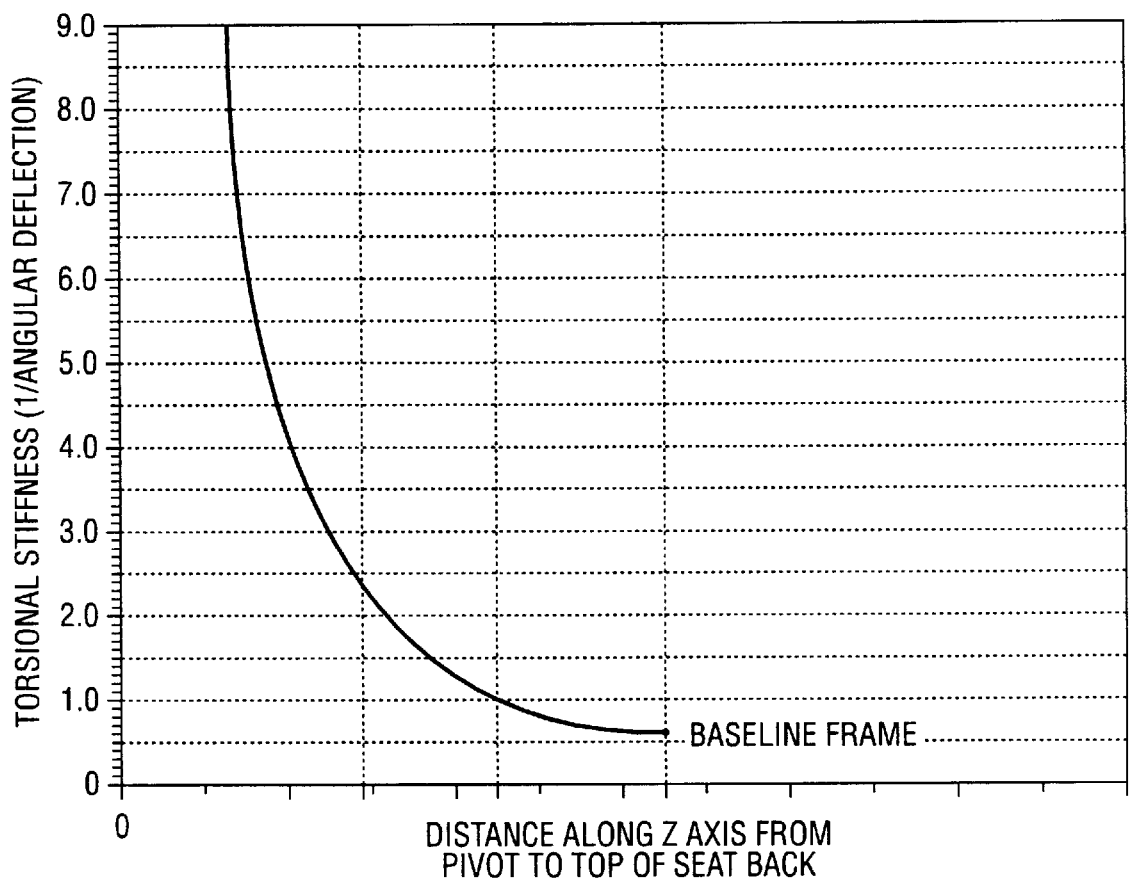
FIG. 32 is a plot of the stiffness of the seat back at various locations of the seat back along a vertical axis.

FIG. 32 shows the spring rate at locations along the sat back when the seat back is loaded in a fore-and-aft direction. FIGS. 16, 17 and 18 show the geometry of the seat back at vertical sectional planes. The plane of section line 18—18 corresponds generally to the vertical center plane of the seat back. Neglecting the effect of the lightening openings, which correspond to openings 118, 119 and 130 in FIG. 7, the seat back at the section corresponding to FIG. 18 would have a low spring rate, which would vary along the Z axis nonlinearly from a high value at the pivot to a low value at the top, as generally shown in FIG. 32, for deflections in the fore-and-aft direction (the X axis direction). The spring rate for the seat back section line 16—16, which is indicated in FIG. 16, would be higher at any location along the seat back than the corresponding spring rate for the seat back section illustrated in FIG. 18. The corresponding spring rate at any location along the seat back for an intermediate lateral location for the seat back would be intermediate the K factor values for the seat back sections shown in FIGS. 16 and 18.

The third requirement of a design for optimum energy management is the force distribution characteristic wherein forces generated by a high energy impact in a fore-and-aft direction at various seat back areas can be distributed to the seat frame base and seat track structure described previously for purposes of accomplishing energy absorption at those areas. This requires a relatively robust and rigid seat back structure near the lower attachment to the vehicle seat track. This rigid link between the seat back and the supporting seat track structure is achieved by increasing the mass of the seat back molding, as illustrated in FIG. 14. This has a high K factor, as explained previously.

FIG. 31 shows a seat back in schematic form for the purpose of illustrating the relationship of the variables that affect the energy management capability. Shown in FIG. 31 are the three principal coordinate axes. The Z axis is on a vertical plane extending through the center of the back frame. The X axis extends in a fore-and-aft direction, and the Y axis extends in a lateral direction. The labels indicated in FIG. 31 correspond to the seat features that are indicated in FIGS. 27, 28 and 29. Those features include bottom, center and top ribs 196, 198 and 200. These ribs extend in a transverse direction and form a rigid assembly together with the side portions 202 and 204. The upper portion of the seat assembly of FIG. 31, as indicated at 206, is referred to as the halo.

First and second transition areas are formed in the lateral sides as seen at 208 and 210 and at 212 and 214. The first transition areas 208 and 210 are labeled in FIG. 31 as the lower pillar. The portions of the seat back directly adjacent the hinge point are referred to as legs, as seen at 216 and 218.

For the purpose of identifying critical features of the seat back for energy management controlling purposes, FIG. 31 includes labels; i.e., bottom rib, center rib, top rib, first transition, hub, lateral support, leg, lower pillar, second transition, pivot hole, Target A, Target B, Target C, Target D and Target E. These labels provide correlation of FIG. 31 with FIGS. 27, 28 and 29.

In FIG. 27, we have identified the seat features that contribute to the achievement of compliance with various automotive vehicle safety and design standards. These standards, for purposes of this description, are identified arbitrarily as Standards A, B, C, D, E and F. For example, one vehicle standard might be a U.S. Federal vehicle standard, another might be a Canadian vehicle standard, and a third might be a European standard. Other standards that might be used are the individual automotive vehicle manufacturing company standards. The significance of the requirements identified in FIG. 27 are rated on a scale of 1 to 10, a rating of 10 being a rating of high contribution to the achievement of a particular standard.

FIG. 28 identifies a loading direction with respect to forces in the X, Y and Z axes and the moments about the X, Y and Z axes that are developed by high energy impact forces for each of the seat features shown in FIG. 31. For example, the moment created by an impact force about the Z axis is largely influenced by the characteristics of the bottom rib, by the Target A location and by the Target D location. It is seen also that loading in the fore-and-aft direction, or the direction of the X axis, is significantly affected by the structural characteristics of all of the seat features indicated in FIG. 1, except the top rib and the lateral support at each side of the seat back.

The significance of the seat features identified in FIG. 31 for purposes of energy management, as distinct from loading direction, is shown in FIG. 29. Each of the shaded areas of FIG. 29 represents a significant energy management component for each of the seat features. For example, the center rib is significant for purposes of energy conversion and energy storage but is less significant for purposes of energy distribution. Energy distribution, however, is of importance for each of the seat portions intermediate the first transition area and the pivot for the legs 216 an 218.

FIG. 30 is a plot that shows the stiffness of a seat back plotted against the vertical distance along the seat back. The stiffness is very high at the base of the seat back near the pivot and decreases to a very low level near the halo region at the top of the seat back. The shape of the curve of FIG. 30 can be varied depending upon the design and safety specifications that are being imposed on the design of the seat construction.

FIG. 32 is a plot of the torsional stiffness of the seat back at various Z axis locations from the pivot to the top of the seat back. This chart was developed by applying a force couple near the top rib location shown in FIG. 31, which developed a moment "T" indicated by the moment vector at the Z axis seen in FIG. 31. Angular deflections at selected Z axis locations along the seat back then were measured for chosen values for the moment "T".

While the best mode for carrying out the invention has been described in detail, those familiar with the art to which this invention relates will recognize various alternative designs and embodiments for practicing the invention that are within the scope of the appended claims.

What is claimed is:

1. A vehicle seat back frame having an upper portion and first and second lower attachment portions for attachment of the back frame in a vehicle, comprising:
   a high density structural injection molded polyurethane material with glass reinforcement fibers, said reinforcement fibers comprising:
      a plurality of glass mat layers formed generally in the shape of the back frame, said glass mat layers being most numerous in said first and second lower attachment portions for added structural integrity;
      said polyurethane material being molded over said plurality of glass mat layers to form the seat back frame;
      said plurality of glass mat layers comprising a first glass mat layer formed generally in the shape of the back frame and having first and second lower attachment portions and first and second side curvature portions extending longitudinally along opposing sides of the back frame;
      a second glass mat layer positioned over said first glass mat layer at said first and second lower attachment portions and extending at least partially along said side curvature portions;
      a third glass mat layer positioned over said second glass mat layer at said first and second attachment portions and extending at least partially along said side curvature portions;
      a fourth glass mat layer positioned over said third glass mat layer at said first and second lower attachment portions and extending at least partially along said side curvature portions; and
      fifth and sixth glass mat layers positioned at said first and second lower attachment portions;
   said back frame having a first spring rate and being flexible with respect to a vertical reference center plane of said back frame;
   said back frame having spring rates that differ from said first spring rate with respect to vertical reference planes between said vertical reference center plane and lateral sides of said back frame;
   said back frame being flexible with respect to lateral reference planes, the spring rates of said back frame at said lateral reference planes being lower adjacent said upper portion of said back frame relative to the spring rate at lateral reference planes below said upper portion;
   said glass reinforcement fibers being positioned in said back frame to effect plastic deformation as said back frame flexes due to impact forces on said back frame, thereby absorbing impact energy as said energy is stored in said seat back due to flexing of said back frame at said vertical and lateral reference planes.

2. The vehicle seat back frame of claim 1 wherein said first glass mat comprises opposing two-ounce per square foot layers of glass with a layer of polypropylene-spun fibers therebetween to allow the polymer material to flow between the opposing two-ounce per square foot layers of glass mat.

3. The vehicle seat back frame of claim 1 wherein said second glass mat layer comprises a four-ounce per square foot glass mat.

4. The vehicle seat back frame of claim 1 wherein said third glass mat layer comprises a four-ounce per square foot glass mat.

5. The vehicle seat back frame of claim 1 wherein said fourth glass mat layer comprises a four-ounce per square foot glass mat.

6. The vehicle seat back frame of claim 1 wherein said fifth and sixth glass mats each comprise opposing two-ounce per square foot layers of glass with a layer of polypropylene-spun fiber therebetween to allow the polymer material to flow between the opposing two-ounce per square foot layers of glass mat.

7. A vehicle seat back frame having an upper portion and first and second lower attachment portions for attachment of the back frame in a vehicle, comprising:
   a high density structural injection molded polyurethane material with glass reinforcement fibers, said reinforcement fibers comprising a plurality of glass mat layers formed generally in the shape of the back frame, said glass mat layers being most numerous in said first and second lower attachment portions for added structural integrity;
   said polyurethane material being molded over said plurality of glass mat layers to form the seat back frame;
   said plurality of glass mat layers comprising a first glass mat layer formed generally in the shape of the back frame and having first and second lower attachment portions and first and second side curvature portions extending longitudinally along opposing sides of the back frame;
   a second glass mat layer positioned over said first glass mat layer at said first and second lower attachment portions and extending at least partially along said side curvature portions;
   a third glass mat layer positioned over said second glass mat layer at said first and second attachment portions and extending at least partially along said side curvature portions;
   a fourth glass mat layer positioned over said third glass mat layer at said first and second lower attachment portions and extending at least partially along said side curvature portions; and
   said back frame having a first spring rate and being flexible with respect to a vertical reference center plane of said back frame;
   said back frame having spring rates that differ from said first spring rate with respect to vertical reference planes between said vertical reference center plane and lateral sides of said back frame;
   said back frame being flexible with respect to lateral reference planes, the spring rates of said back frame at said lateral reference planes being lower adjacent said upper portion of said back frame relative to the spring rate at lateral reference planes below said upper portion;
   said glass reinforcement fibers being positioned in said back frame to effect plastic deformation as said back frame flexes due to impact forces on said back frame, thereby absorbing impact energy as said energy is stored in said seat back due to flexing of said back frame at said vertical and lateral reference planes; and a high density injection molded polymer material enclosing the mat layers;

said glass mat layers comprising woven glass fiber material with glass fibers extending in the direction of each of perpendicular reference axes corresponding to orientation of said glass fibers and a glass chop material with random glass fiber orientation, said woven glass fiber material being located primarily at the surface of said back frame and said glass chop being disposed within the interior of said back frame whereby the number of said mats at each location of said back frame, the thickness of said mats and the orientation of said woven material being variable in accordance with predetermined design requirements.

8. The vehicle seat back frame of claim 7 wherein said polymer material comprises urethane.

* * * * *